(12) United States Patent
Yamakawa et al.

(10) Patent No.: US 7,781,359 B2
(45) Date of Patent: Aug. 24, 2010

(54) HIGH-FREQUENCY DIELECTRIC MATERIAL

(75) Inventors: Takahiro Yamakawa, Tomioka (JP); Shi Luo, Tomioka (JP)

(73) Assignee: Yokowo Co., Ltd., Tokyo-To (JP)

( * ) Notice: Subject to any disclaimer, the term of this patent is extended or adjusted under 35 U.S.C. 154(b) by 137 days.

(21) Appl. No.: 12/295,433

(22) PCT Filed: Apr. 16, 2007

(86) PCT No.: PCT/JP2007/058686
§ 371 (c)(1),
(2), (4) Date: Sep. 30, 2008

(87) PCT Pub. No.: WO2007/123221
PCT Pub. Date: Nov. 1, 2007

(65) Prior Publication Data
US 2009/0124482 A1  May 14, 2009

(30) Foreign Application Priority Data
Apr. 17, 2006  (JP) .............................. 2006-113046

(51) Int. Cl.
*C04B 35/465* (2006.01)
*C04B 35/499* (2006.01)
(52) U.S. Cl. ................. 501/135; 501/136; 264/614; 264/615
(58) Field of Classification Search ................ 501/135, 501/136; 264/614, 615
See application file for complete search history.

(56) References Cited

U.S. PATENT DOCUMENTS

| 5,444,028 | A | * | 8/1995 | Takahashi et al. ........... 501/136 |
| 5,629,252 | A | * | 5/1997 | Nishimoto et al. .......... 501/136 |
| 6,242,375 | B1 | * | 6/2001 | Hong et al. ................. 501/134 |
| 2009/0105063 | A1 | * | 4/2009 | Luo et al. ................... 501/123 |

FOREIGN PATENT DOCUMENTS

| JP | 05335179 A | 12/1993 |
| JP | 2000044341 A | 2/2000 |
| JP | 2005008468 A | 1/2005 |

* cited by examiner

*Primary Examiner*—Karl E Group
(74) *Attorney, Agent, or Firm*—The Webb Law Firm

(57) ABSTRACT

There is provided a high-frequency dielectric material that has a high relative permittivity, a high Q value, and a TCF property value close to zero (0) and can realize co-firing of the dielectric material with silver (Ag) and copper (Cu). The high-frequency dielectric material is characterized by comprising a composition of main constituent materials having a formulation of CaO: 1 mole, $Nb_2O_5$: $(1-\alpha\times\beta)/3$ mole, ZnO: $(1-\alpha)/3$ mole, $TiO_2$: $\gamma$ mole, and $Li_2O$: $\alpha\times(1-\beta)/6$ mole, wherein $0.65 \leq \alpha \leq 0.75$, $0.09 \leq \beta \leq 0.15$, $0.066 \leq \alpha\times\beta \leq 0.100$, and $0.15 \leq \gamma \leq 0.35$; and 1 to 5 parts by weight, based on 100 parts by weight of the composition of main constituent materials, of a sintering aid selected from the group consisting of oxides of copper (Cu), boron (B), lithium (Li), bismuth (Bi), and vanadium (V) and a mixture of two or more of the oxides.

8 Claims, 3 Drawing Sheets

US 7,781,359 B2

HIGH-FREQUENCY DIELECTRIC MATERIAL

TECHNICAL FIELD

The present invention relates to a high-frequency dielectric material. More particularly, the present invention relates to a high-frequency dielectric material that can realize low-temperature firing, has a high relative permittivity, has no significant signal loss in a high-frequency zone, and, further, has a resonance frequency temperature coefficient close to zero (0).

BACKGROUND OF THE INVENTION

In the field of the so-called "laminated ceramic component/substrate" provided with a capacitor, a resistor, or wiring in its interior, high-frequency dielectric materials, which are ceramic materials comprising not less than 95% of alumina as a main component and silica, alkaline earth metal oxides and the like, have hitherto been used. For such high-frequency dielectric materials, the firing temperature should be one thousand and a few hundred degrees Celsius. Accordingly, high-melting point materials such as tungsten and molybdenum have been used as an internal conductor.

In recent years, however, there is an increasing demand for a technique which can realize transmission of microwave or milli-wave zone signals with low loss. This demand has led to a tendency toward the use of, for example, silver (Ag) or copper (Cu) having lower electric resistance than tungsten and molybdenum as an internal conductor. In general, in high-frequency dielectric materials which are co-fired with the internal conductor, high-frequency dielectric materials which can be sintered at a temperature below the melting point of the internal conductor material should be used. Since silver, copper and the like have a lower melting point than tungsten and molybdenum, high-frequency dielectric materials, which can be sintered at a temperature below the temperature required in the case where tungsten or molybdenum is used as the internal conductor, should be used. For example, when high-frequency dielectric materials are co-fired with silver as the internal conductor, the high-frequency dielectric materials used should be those that can be fired at a temperature satisfactorily below 962° C., i.e., the melting point of silver, for example, at a temperature of about 900° C. Such ceramics are called "low temperature co-fired ceramics" (LTCCs), and various composition systems have recently been proposed.

Among low temperature co-fired ceramics, for example, a system comprising $BiNbO_4$ and $V_2O_5$ added as a sintering aid to $BiNbO_4$ has hitherto been proposed as materials having high relative permittivity (referred to also as ∈r) and quality factor (referred to also as Q value; a reciprocal number of dielectric loss angle tanδ) and a resonance frequency temperature coefficient (referred to also as TCF or τf, or referred to simply as temperature coefficient) close to zero (0). This system has high-frequency (GHz zone) properties of a relative permittivity of about 45, a Q value of about 4000, and a TCF value of −10 to +40 ppm/° C. Further, as described in Japanese Patent Laid-Open No. 44341/2000 (patent document 1), a material of 45 mol % $ZnNb_2O_6$+55 mol % $TiO_2$+a few percent of sintering aid has been developed which has a relative permittivity of 42, a Q value of 4000 to 20000, and a TCF value of −1 to +12 ppm/° C. (a value around 6 GHz).

In these materials, when a production process in which, after pre-firing of a high-frequency dielectric material, a silver paste is printed and baked on the pre-fired material, is used, the resultant assembly can exhibit functions as dielectric material/insulator without any problem. The adoption of co-firing of the high-frequency dielectric material with the internal conductor, for example, the adoption of a method comprising preparing a sheet using the high-frequency dielectric material, printing and stacking a fine wiring of a silver paste onto the sheet, and co-firing the high-frequency dielectric material with silver, however, poses a problem that silver dissipation due to a reaction of silver with ceramic components or very rapid diffusion of silver into the ceramic components occurs and makes it impossible to form wirings as designed. Various studies have been made on material systems where the dissipation of silver is not substantially observed. However, there is no report about a material which can realize firing at a temperature of 900° C. or below white having a high relative permittivity, a Q value exceeding 1000 in GHz zone, and a TCF property value close to zero (0).

[Patent document 1] Japanese Patent Laid-Open No. 44341/2000

DISCLOSURE OF THE INVENTION

In view of the above problems of the prior art, the present invention has been made, and an object of the present invention is to provide a high-frequency dielectric material having a high relative permittivity, a high Q value, and a TCF property value close to zero (0) and can realize co-firing with silver (Ag) and copper (Cu). More specifically, an object of the present invention is to provide a high-frequency dielectric material that has a high relative permittivity of more than 45, a Q value of more than 1000 in GHz zone, and a TCF property value close to zero (0) and, at the same time, can realize firing at a temperature of 900° C. or below and does not substantially cause dissipation of silver in such an amount that poses a problem.

The above object can be attained by a high-frequency dielectric material, characterized by comprising:

a composition of main constituent materials having a formulation of

CaO: 1 mole, $Nb_2O_5$: $(1-\alpha\times\beta)/3$ mole,

ZnO: $(1-\alpha)/3$ mole, $TiO_2$: $\gamma$ mole, and $Li_2O$: $\alpha\times(1-\beta)/6$ mole, wherein $0.65 \leq \alpha \leq 0.75$, $0.09 \leq \beta \leq 0.15$, $0.066 \leq \alpha\times\beta \leq 0.100$, and $0.15 \leq \gamma \leq 0.35$; and 1 to 5 parts by weight, based on 100 parts by weight of the composition of main constituent materials, of a sintering aid selected from the group consisting of oxides of copper (Cu), boron (B), lithium (Li), bismuth (Bi), and vanadium (V) and a mixture of two or more of said oxides.

Preferably, the high-frequency dielectric material according to the present invention comprises at least boron oxide and lithium oxide as the sintering aid.

Further, according to the present invention, there is provided a process for producing a high-frequency dielectric material, comprising the steps of:

mixing main constituent materials according to a formulation of

CaO: 1 mole, $Nb_2O_5$: $(1-\alpha\times\beta)/3$ mole,

ZnO; $(1-\alpha)/3$ mole, $TiO_2$: $\gamma$ mole, and $Li_2O$: $\alpha \times (1-\beta)/6$ mole, wherein $0.65 \leq \alpha \leq 0.75$, $0.09 \leq \beta \leq 0.15$, $0.066 \leq \alpha \times \beta \leq 0.100$, and $0.15 \leq \gamma \leq 0.35$;

calcining the resultant main constituent material mixture at a temperature of 800 to 1100° C.;

while pulverizing the main constituent material mixture, mixing 1 to 5 parts by weight, based on 100 parts by weight of the main constituent material mixture, of a sintering aid selected from the group consisting of simple substances or compounds of copper, boron, lithium, bismuth and vanadium and their mixtures, into the main constituent material mixture;

molding the resultant mixture of the main constituent material mixture with the sintering aid; and firing the molded product of the mixture of the main constituent material mixture with the sintering aid at a temperature of 850 to 900° C.

According to another embodiment of the present invention, there is provided a process for producing a high-frequency dielectric material, comprising the steps of:

mixing main constituent material according to a formulation of

CaO: 1 mole, $Nb_2O_5$: $(1-\alpha \times \beta)/3$ mole,

ZnO: $(1-\alpha)/3$ mole, $TiO_2$: $\gamma$ mole, and $Li_2O$: $\alpha \times (1-\beta)/6$ mole, wherein $0.65 \leq \alpha \leq 0.75$, $0.09 \leq \beta \leq 0.15$, $0.066 \leq \alpha \times \beta \leq 0.100$, and $0.15 \leq \gamma \leq 0.35$;

subjecting the resultant main constituent material mixture to primary calcination at a temperature of 800 to 1100° C., mixing 1 to 5 parts by weight, based on 100 parts by weight of the main constituent material mixture, of a sintering aid selected from the group consisting of simple substances or compounds of copper, boron, lithium, bismuth and vanadium and their mixtures, into the main constituent material mixture;

subjecting the resultant mixture of the main constituent material mixture with the sintering aid to secondary calcination at a temperature of 800 to 1100° C.;

pulverizing the mixture of the main constituent material mixture with the sintering aid subjected to the secondary calcination;

molding the pulverized product of the mixture of the main constituent material mixture with the sintering aid; and firing the molded product of the mixture of the main constituent material mixture with the sintering aid at a temperature of 850 to 900° C.

In the production process of a high-frequency dielectric material according to the present invention, preferably, at least a simple substance or compound of boron and a simple substance or compound of lithium are contained as the sintering aid.

In the production process of a high-frequency dielectric material according to the present invention, preferably, after the molding of the mixture of the main constituent material mixture with the sintering aid, a silver (Ag) or copper (Cu) conductor is formed on the molded product and the assembly is then fired.

The high-frequency dielectric material according to the present invention can realize co-firing with a conductor formed of silver or copper, and, even upon co-firing with the conductor, does not substantially cause silver dissipation derived from a reaction with silver or the like or silver diffusion and has a relative permittivity of more than 45 and a Q value of more than 1000 in GHz zone, and a TCF property value close to zero (0), and thus can be used for low temperature fired laminated ceramic components and substrate materials used in high frequencies above the GHz zone.

BEST MODE FOR CARRYING OUT THE INVENTION

Figure 1:
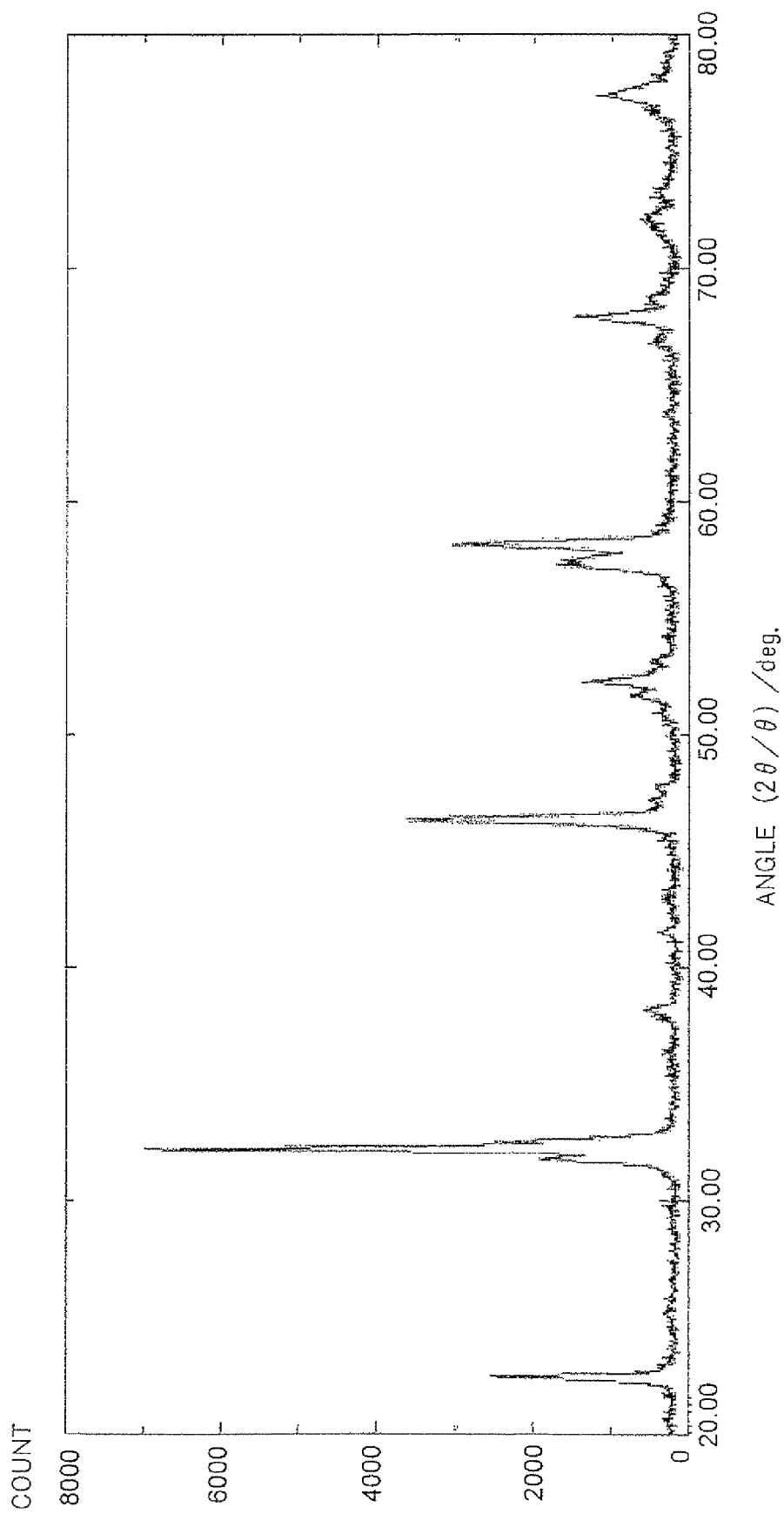
FIG. 1 is an X-ray diffraction chart of a high-frequency dielectric material according to the present invention.

Embodiments of the present invention will be described.

Mixing ratio

Mixing ratio of main constituent materials

In the dielectric materials according to the present invention., regarding the mixing ratio of the main constituent materials, the proportion based on one mole of CaO is expressed using $\alpha$, $\beta$ and $\gamma$. Specifically, the mixing ratio of the main constituent materials satisfies the requirement that, based on one mole of CaO, the $Nb_2O_5$ content is $(1-\alpha \times \beta)/3$ mole, the ZnO content is $(1-\alpha)/3$ mole, the $TiO_2$ content is $\gamma$ mole, and the $Li_2O$ content is $\alpha \times (1-\beta)/6$ mole, wherein $\alpha$, $\beta$ and $\gamma$ are $0.65 \leq \alpha \leq 0.75$, $0.09 \leq \beta \leq 0.15$, $0.066 \leq \alpha \times \beta \leq 0.100$, and $0.15 \leq \gamma \leq 0.35$.

When the $\alpha$ value is below the lower limit of the above-defined range, the relative permittivity is lowered. On the other hand, when the $\alpha$ value is large, the Q value is lowered. In particular, when the $\alpha$ value is larger than 0.75, the Q value of the dielectric material is not more than 1000. Accordingly, the $\alpha$ value is limited to 0.65 to 0.75.

When the $\beta$ value is below the lower limit of the above-defined range, the relative permittivity is lowered. On the other hand, when the $\beta$ value is above the upper limit of the above-defined range, the TCF value is significantly deviated on the plus side and, consequently, the absolute value becomes large, Accordingly, the $\beta$ value is limited to 0.09 to 0.15.

Further, even when the $\alpha$ and $\beta$ values fall within the respective defined ranges, the relative permittivity is lowered in the case where the product of $\alpha$ and $\beta$ is below the lower limit of the above-defined range. When the product of $\alpha$ and $\beta$ is above the upper limit of the above-defined range, the TCF value is significantly deviated on the plus side, and the absolute value becomes large. Accordingly, the value of $\alpha \times \beta$ is limited to 0.066 to 0.100.

In addition, when the γ value is below the lower limit of the above-defined range, the relative permittivity is lowered and is less than 45 and the TCF value is significantly deviated on the minus side, and the absolute value becomes large. When the γ value is above the upper limit of the above-defined range, the Q value is lowered and the TCF value is significantly deviated on the plus side, resulting in a large absolute value. Accordingly, the γ value is limited to 0.15 to 0.35.

Mixing ratio of sintering aid

In the dielectric material according to the present invention, a sintering aid is added to realize sintering by low-temperature firing. In order to realize co-firing with a silver conductor, sintering at a temperature of 900° C. or below is desired. When the content of the sintering aid is low, sintering and densification by low-temperature firing are difficult. On the other hand, when the content of the sintering aid is high, the property value of the dielectric material is deteriorated. Accordingly, in the present invention, one or at least two of oxides of copper (Cu), boron (B), lithium (Li), bismuth (Bi), and vanadium (V) are contained, as the sintering aid, in a total amount (outer proportion) of not less than 1 part by weight and not more than 5 parts by weight in terms of $CuO$, $B_2O_3$, $Li_2O$, $Bi_2O_3$ and $V_2O_5$ based on 100 parts by weight of the main constituent materials.

Raw Materials

Raw Materials for Main Constituent Materials

In the dielectric material according to the present invention, for CaO, $Nb_2O_5$, ZnO, $TiO_2$, and $Li_2O$ as main constituent materials, for example, oxides, carbonates and hydroxides which are commonly used industrial raw materials may be used. For CaO and $Li_2O$ sources among them, carbonates are preferred because of less susceptibility to a deterioration with the elapse of time during storage of the raw materials. For $Nb_2O_5$, ZnO, and $TiO_2$ sources, oxides which are inexpensive may be used.

Raw Material for Sintering Aid

In the dielectric material according to the present invention, for copper, boron, lithium, bismuth and vanadium as sintering aids, the addition thereof in the form of oxides is not always required so far as, after firing in the air, materials can be converted to oxides, for example, by themselves or by a reaction with the main constituent materials according to the present invention. Such compounds include $Li_2O$, $Li_2Co_3$, and LiOH for lithium and boron oxide $B_2O_3$, boric acid $H_3BO_3$, hexagonal boron nitride h-BN, and boron carbide $B_4C$ for boron. h-BN as such is less likely to be oxidized at 850° C. When h-BN is mixed with the main constituent materials according to the present invention followed by heating to 850° C. or above, however, h-SN is converted to an oxide which can function as a sintering aid.

When lithium is used as the sintering aid, lithium as such has no significant satisfactory sinterability improvement effect. The use of a combination of lithium with another sintering aid, for example, boron, however, can advantageously offer satisfactory sinterability. On the other hand, when boron is used as the sintering aid, it should be noted that boron as such also does not have a satisfactorily high sinterability improvement effect. The use of a combination of boron with another sintering aid, for example, lithium, can advantageously offer satisfactory sinterability.

The amount of lithium used as the sintering aid may also be determined from a dielectric material after sintering, for example, by calculating $\alpha \times (1-\beta)/6$ based on α and β values determined by a calculation from the composition of the main constituent materials and subtracting the calculated value from the whole lithium amount.

Production Process

The dielectric material according to the present invention may be produced by mixing at least the main constituent materials and the sintering aid together, molding the mixture and sintering the molded product. In this case, at a suitable production stage, if necessary, a calcination step and a pulverization step may also be provided.

The production process of a dielectric material according to the present invention may be specifically carried out, for example, as follows. However, it should be noted that the production process according to the present invention is not limited to the following embodiments.

(1) A production process comprising carrying out the step of mixing raw materials for main constituent materials together, the step of calcination, the step of pulverization while mixing a sintering aid into the system, the step of molding, and the step of firing in that order.

(2) A production process comprising carrying out the step of mixing raw materials for main constituent materials together, the step of calcination, the step of mixing a sintering aid into the calcination product, the step of secondary calcination, the step of pulverization, the step of molding, and the step of firing in that order (3) A production process comprising carrying out the step of mixing raw materials for all the components, the step of calcination, the step of pulverization, the step of molding, and the step of firing in that order.

(4) A production process comprising carrying out the step of mixing raw materials for all the components, the step of molding, and the step of firing in that order (the step of calcination being omitted).

Among these embodiments, the process comprising previously mixing only main constituent materials together, drying the mixture, calcining the dried mixture, and then mixing a sintering aid into the calcination product (processes (1) and (2)) is preferred, because a single phase having excellent crystallinity can be formed by calcining the main constituent materials at an elevated temperature of about 1000 to 1100° C. and the subsequent addition of the sintering aid followed by densification at a low temperature can allow high and stable dielectric material properties to be easily provided.

Further, the process (1) is simpler in steps than the process (2). When some sintering aids are used, however, in the step of conducting pulverization while mixing the sintering aid into the system, in some cases, the raw materials become a slime form, making it difficult to carry out molding Accordingly, the limitation of the molding method and the provision of means for ensuring the moldability are sometimes necessary. For example, when $B_2O_3$ or $H_3BO_3$ is used as the boron source, $B_2O_3$ or $H_3BO_3$ is likely to be polymerized with a high-molecular weight polymer for a binder to form a slime.

Further, for the process (2), the number of process steps is larger than that in the process (1). In the process (2), however, advantageously, the sintering aid component is brought to such a state that has been reacted with the main constituent materials to a certain extent. Accordingly, independently of the type of the sintering aid, the difficulty of molding can be advantageously avoided.

For the process (3), calcination is carried out in such a state that the sintering aid has been mixed. When the calcination is carried out, for example, at a temperature of 850° C. or above, the material becomes hard upon the calcination and, consequently, pulverization sometimes becomes difficult. Accordingly, ensuring the denseness of the material after subsequent molding and firing is difficult, and, thus, the provision of means for ensuring the densification is sometimes necessary. On the other hand, when the calcination is carried out, for example, at a temperature of 850° C. or below, excellent crystallinity cannot be provided without difficulties and it is difficult to produce a dielectric material having a high level of properties. The process (3), however, is advantageous in that the number of process steps is smaller and, independently of the type of the sintering aid, the difficulty of molding can be avoided.

For the process (4), advantageously, the number of process steps is the smallest and, thus, the process is simple, although a dielectric material having high denseness and homogeneity and a high level of properties is less likely to be provided.

In this case, when lithium is used as at least a part of the sintering aid, the adoption of a process in which a mixture of only the main constituent materials is calcined followed by mixing of the sintering aid into the calcination product (the process (1) or (2)) is preferred, because the satisfactory sintering can be achieved more easily than the case where the process in which the main constituent materials are previously mixed with the sintering aid followed by firing.

In mixing only the main constituent materials together or in mixing the main constituent materials with the sintering aid, any method may be adopted so far as thorough mixing can be achieved. Further, the mixing may be combined with pulverization, for example, after the calcination. In mixing and/or pulverization, ball mill mixing may be typically used. Conventional methods such as bead mills and counter jet mills may also be used.

When the mixing is carried out by a wet method, the resultant mixture is dried. The drying means is not particularly limited, and conventional drying means, for example, spray driers and rotary evaporators may be used. When the spray drier is used, a more homogeneous raw material powder can be advantageously produced. When water is used as a solvent for the mixing or pulverization and a water soluble material, for example, boric acid ($H_3BO_3$) or lithium carbonate ($Li_2CO_3$), is used as the sintering aid, preferably, drying means for separating and discharging a solvent to the outside of the system, for example, a filter press, is not used, because these sintering aids are dissolved in water. When a lower alcohol is used as the solvent, lithium and boron are reacted with the alcohol upon heating to form an alkoxide, which, together with the solvent, is evaporated to the outside of the system upon the removal of the solvent by drying and, consequently, the addition amount of lithium and boron is sometimes less than the designed addition amount. Accordingly, this combination is preferably avoided.

When the calcination is carried out, preferred conditions are temperature about 800° C. to 1100° C. and time about 1 to 4 hr. The calcination can advantageously improve the homogeneity of the components and, further, can realize the regulation of the shrinkage. The calcination may be carried out by any method without particular limitation. For example, the calcination can be carried out by placing the material, for example, in an alumina pot and carrying out calcination in the air in an electric furnace or a gas furnace. When the calcination temperature is about 800° C. or below, for some raw materials, unfavorable phenomena are likely to occur such that a satisfactory reaction between the raw materials does not occur and the carbonate raw material remains undecomposed. These unfavorable phenomena make the densification after sintering difficult, and, in some cases, desired properties cannot be provided. On the other hand, when the calcination temperature is above 1100° C., the powder after the calcination becomes hard, often resulting in deteriorated pulverizability For example, however, particularly when the raw materials are constituted only by oxides, the raw material mixture may be molded and fired without the calcination.

The molding method is not particularly limited. For example, conventional molding means for high-frequency dielectric materials as ceramic materials, for example, tape casting methods using doctor blade methods or slot die methods, and other conventional molding methods may be used.

Regarding the firing, when silver is used as an internal conductor which is stacked by printing on a molded product followed by co-firing, the firing may be carried out at a temperature at or above the temperature where the raw material powders of the high-frequency dielectric material can be sintered, and at or below the melting point of silver. The firing temperature is typically 850 to 900° C. Regarding the firing atmosphere, when a compound, for example, BN or $B_4C$, which requires oxygen for conversion to an oxide, is present in the raw materials, an oxygen-containing atmosphere such as atmospheric air is adopted. The silver paste, which is co-fired with the dielectric material according to the present invention, is not particularly limited, and conventional commercially available products may be used.

Even when copper is used instead of silver as the conductor, the same effect as in the case where silver is used can be attained. When copper is used as the conductor, the firing atmosphere is preferably a weakly reducing atmosphere (for example, nitrogen+hydrogen) or an inert (neutral) atmosphere (for example, argon or nitrogen). In firing in such a form that contains a large amount of an organic binder, the incorporation of water vapor (due point about 40° C. to 60° C.) in the atmosphere gas facilitates debindering and thus is preferred. When copper is used as the conductor, preferably, a compound, for example, BN or $B_4C$, which requires oxygen for conversion to an oxide, is not used as the sintering aid.

Fired Product

When the dielectric material according to the present invention has been fired at 850 to 900° C., a main crystal phase formed of the main constituent materials typically has an orthorhombic perovskite crystal structure which exhibits a chart similar to an XRD chart of $CaNbO_3$ (ICDD data base card No. 47-1668). In this case, the d value, which gives a diffraction peak at lattice spacing corresponding to 101 plane in hkl is slightly larger than the data described in the card. The values on 202, 040 and 123 planes are smaller than the data in the card. The value on 121 plane is substantially equal to the numerical value in the card. Other phases which cannot be identified are sometimes included but the content thereof is low. Accordingly, the dielectric material is considered to be constituted by a substantially single phase.

FIG. 1 shows an example of an X-ray diffraction chart of the dielectric material according to the present invention. This X-ray diffraction chart shown in FIG. 1 is a chart for a sample measured with a powder X-ray diffractometer MiniFlex (X-ray tube target: copper) manufactured by Rigaku Corporation. The sample is a dielectric material according to the present invention produced by providing a main constituent material represented by $\alpha=0.70$, $\beta=0.13$, and $\gamma=0.27$, adding 0.8 part by weight of $B_2O_3$ and 1.7 parts by weight of CuO to the main constituent material, and firing the mixture under conditions of 870° C.×2 hr. The ordinate represents the intensity (cps) of diffraction line measured with a scintillation counter, and the abscissa represents the angle (2θ/deg) as measured with a goniometer. Since the size of the unit lattice of the main constituent material crystal varies slightly depending upon $\alpha$, $\beta$, and $\gamma$ values, the position of each peak on the chart varies slightly. Since, however, the crystal structure of perovskite type remains unchanged, the relative positional relationship (shape of chart) remains unchanged.

Figure 2:
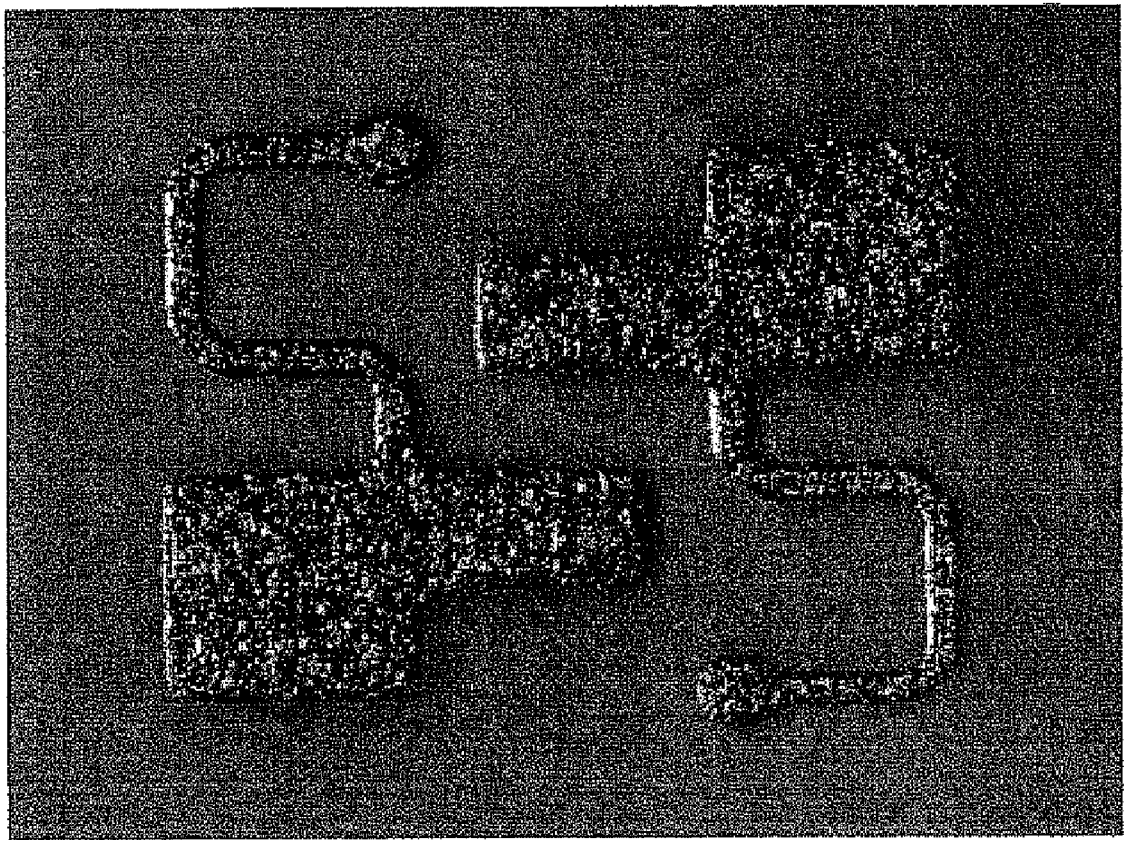
FIG. 2 is a photomicrograph of a fine pattern formed on a substrate by printing a silver paste on a surface of a molded product (before firing) produced by monoaxially pressing a dielectric material according to the present invention into a disk, and co-firing the dielectric material with the printed silver.

FIG. 2 is a photomicrograph of a fine pattern formed on a substrate by monoaxially pressing a dielectric material according to the present invention into a molded product in a disk form, printing a silver paste on a surface of the molded product (before firing), and co-firing the molded product with the printed silver. More specifically, the photomicrograph shown in FIG. 2 is one in which the surface of a sample obtained by providing a dielectric material according to the present invention comprising 100 parts by weight of a main constituent material represented by $\alpha=0.70$, $\beta=0.13$, and $\gamma=0.27$ and 1.1 parts by weight, based on 100 parts by weight of the main constituent material, of $B_2O_3$+1.0 part by weight, based on 100 parts by weight of the main constituent material, of $Li_2O$ added as sintering aids to the main constituent material, molding the dielectric material into a molded product, printing a silver paste (ML-4062, manufactured by Shoei Chemical Inc.) on the molded product before firing, drying the assembly, and firing the dried assembly under conditions of 870° C.×2 hr has been photographed under a stereomicroscope.

Figure 3:
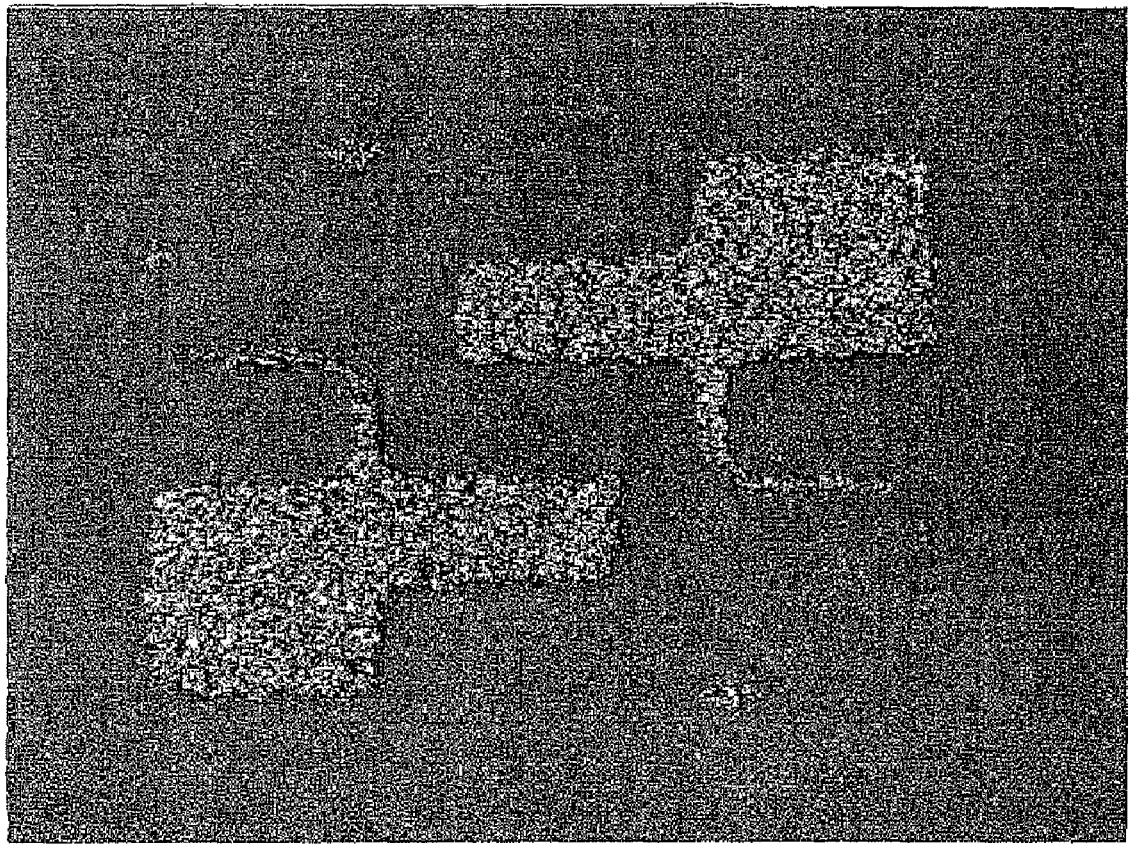
FIG. 3 is a photomicrograph of a fine pattern formed on a substrate by printing a silver paste on a surface of a molded product (before firing) produced by monoaxially pressing a conventional dielectric material into a disk, and co-firing the dielectric material with the printed silver.

FIG. 3 is a photomicrograph of a fine pattern formed on a substrate by monoaxially pressing a conventional dielectric material into a molded product in a disk form, printing a silver paste on a surface of the molded product (before firing), and co-firing the molded product with the printed silver. More specifically, the photomicrograph shown in FIG. 3 is one in which the surface of a sample obtained by providing a main constituent material of 45% by mole of $ZnNb_2O_6$+55% by mole of $TiO_2$, adding 1.5 parts by weight, based on 100 parts by weight of the main constituent material, of $B_2O_3$ and 2.0 parts by weight, based on 100 parts by weight of the main constituent material, of CuO as sintering aids to the main constituent material to prepare a conventional dielectric material (Japanese Patent Laid-Open No. 44341/2000), molding the dielectric material into a molded product, printing a silver paste (ML-4062, manufactured by Shoei Chemical Inc.) on the molded product before firing, drying the assembly, and firing the dried assembly under conditions of 870° C.×2 hr has been photographed under a stereomicroscope.

The present invention can provide a high-frequency dielectric material which typically has a relative permittivity of 45 to 55, a Q value of 1000 to 3000, and a TCF value of −20 to +20.

EXAMPLES

First Group of Examples and Comparative Examples

High-purity fine powders of calcium carbonate, niobium pentoxide, lithium carbonate, zinc oxide, and titanium oxide were provided as raw materials. These raw materials were weighed according to $\alpha$, $\beta$ and $\gamma$ shown in Table 1 so that, based on CaO; 1 mole, the composition was $Nb_2O_5$: $(1-\alpha\times\beta)/3$ mole, ZnO: $(1-\alpha)/3$ mole, $TiO_2$: $\gamma$ mole, and $Li_2O$: $\alpha\times(1-\beta)/6$ mole. For each composition, calculation and weighing were carried out so that the total amount of the raw materials was 55 g. These raw materials, together with about 1 kg of zirconia balls (3 mm$\phi$) and 150 cc of ion exchanged water, were placed in a 500-cc plastic container and were mixed together at 60 rpm for 16 hr. After the mixing, the resultant slurry was transferred to a teflon-coated stainless steel vat and was dried in a thermostatic chamber kept at 130° C. After the drying, the dried product was disintegrated in an alumina mortar, was subjected to particle size regulation through a nylon mesh with an opening of about 100 μm. The size regulated particles were packed into an alumina box-shaped pot, followed by calcination in the air in an electric furnace at 1000° C. for 2 hr. Thereafter, 1.5 parts by weight (outer proportion) of cupric oxide (CuO) and 1.2 parts by weight (outer proportion) of boron oxide ($B_2O_3$) were added to 100 parts by weight of the calcined powder. In the same manner as in the above mixture, the mixture was pulverized for 16 hr and was dried. PVA and DBP were added to the resultant powder, and the mixture was passed through a nylon mesh to give granules.

The granules were molded with a mold into a product having a size of about 20 mm$\phi$×9 mm which was then placed on an alumina setter and was fired under conditions of temperature 870° C. and time 2 hr. The relative permittivity at about 3 GHz, tan$\delta$ and resonance frequency were measured with a network analyzer by a perturbation method. The measurement was carried out at 25° C. and 85° C. The temperature coefficient TCF of resonance frequency was determined by dividing the level of change in resonance frequency by the resonance frequency and temperature difference (60° C.), and Q value was determined from tan$\delta$. Further, a silver (Ag) paste was printed on the surface of the molded product, and the assembly was fired under the above conditions. The dissipated state of the silver conductor was observed under an optical microscope. The results are shown in Table 1.

TABLE 1

|  | $\alpha$ | $\beta$ | $\gamma$ | $\alpha \times \beta$ | $\epsilon r$ | Q | TCF | Reaction with Ag |
|---|---|---|---|---|---|---|---|---|
| Ex. 1 | 0.65 | 0.11 | 0.15 | 0.072 | 45.1 | 1540 | −9.6 | Not reacted |
| Ex. 2 | 0.65 | 0.12 | 0.16 | 0.078 | 45.3 | 1560 | −5.9 | Not reacted |
| Ex. 3 | 0.65 | 0.13 | 0.15 | 0.085 | 45.4 | 1550 | −1.2 | Not reacted |
| Ex. 4 | 0.65 | 0.14 | 0.19 | 0.091 | 45.5 | 1560 | 1.6 | Not reacted |
| Ex. 5 | 0.65 | 0.15 | 0.16 | 0.098 | 45.7 | 1650 | 12.5 | Not reacted |
| Ex. 6 | 0.66 | 0.10 | 0.25 | 0.066 | 45.0 | 1530 | −16.8 | Not reacted |
| Ex. 7 | 0.66 | 0.14 | 0.27 | 0.092 | 47.2 | 1490 | 3.5 | Not reacted |
| Ex. 8 | 0.66 | 0.15 | 0.22 | 0.099 | 48.2 | 1610 | 18.7 | Not reacted |
| Ex. 9 | 0.68 | 0.12 | 0.17 | 0.082 | 45.3 | 1310 | −3.4 | Not reacted |
| Ex. 10 | 0.70 | 0.10 | 0.30 | 0.070 | 45.9 | 1340 | −12.5 | Not reacted |
| Ex. 11 | 0.70 | 0.13 | 0.27 | 0.091 | 50.5 | 1870 | −2.3 | Not reacted |
| Ex. 12 | 0.71 | 0.14 | 0.33 | 0.099 | 52.4 | 1120 | 19.2 | Not reacted |
| Ex. 13 | 0.72 | 0.11 | 0.17 | 0.079 | 46.3 | 1260 | −6.7 | Not reacted |
| Ex. 14 | 0.74 | 0.09 | 0.27 | 0.067 | 45.2 | 1140 | −16.5 | Not reacted |
| Ex. 15 | 0.74 | 0.13 | 0.29 | 0.096 | 50.5 | 1110 | 15.6 | Not reacted |

TABLE 1-continued

| | α | β | γ | α × β | εr | Q | TCF | Reaction with Ag |
|---|---|---|---|---|---|---|---|---|
| Ex. 16 | 0.75 | 0.09 | 0.32 | 0.068 | 45.6 | 1060 | 5.9 | Not reacted |
| Ex. 17 | 0.75 | 0.10 | 0.31 | 0.075 | 46.7 | 1020 | −10.5 | Not reacted |
| Ex. 18 | 0.75 | 0.11 | 0.27 | 0.083 | 47.2 | 1010 | −4.3 | Not reacted |
| Ex. 19 | 0.75 | 0.12 | 0.25 | 0.090 | 47.8 | 1020 | −0.4 | Not reacted |
| Ex. 20 | 0.75 | 0.13 | 0.30 | 0.098 | 51.1 | 1030 | 17.4 | Not reacted |
| Comp. Ex. 1 | 0.64 | 0.10 | 0.27 | 0.064 | 44.0 | 1670 | −18.3 | Not reacted |
| Comp. Ex. 2 | 0.64 | 0.11 | 0.15 | 0.070 | 44.2 | 1570 | −9.8 | Not reacted |
| Comp. Ex. 3 | 0.64 | 0.12 | 0.32 | 0.077 | 44.3 | 1230 | 2.6 | Not reacted |
| Comp. Ex. 4 | 0.64 | 0.13 | 0.18 | 0.083 | 44.5 | 1680 | −2.0 | Not reacted |
| Comp. Ex. 5 | 0.64 | 0.14 | 0.20 | 0.090 | 44.6 | 1640 | −0.6 | Not reacted |
| Comp. Ex. 6 | 0.64 | 0.15 | 0.35 | 0.096 | 44.7 | 1710 | 15.9 | Not reacted |
| Comp. Ex. 7 | 0.64 | 0.16 | 0.16 | 0.102 | 44.9 | 1680 | 21.3 | Not reacted |
| Comp. Ex. 8 | 0.65 | 0.08 | 0.24 | 0.052 | 40.1 | 1620 | −19.8 | Not reacted |
| Comp. Ex. 9 | 0.65 | 0.10 | 0.21 | 0.065 | 44.1 | 1590 | −17.5 | Not reacted |
| Comp. Ex. 10 | 0.65 | 0.16 | 0.18 | 0.104 | 45.8 | 1660 | 21.6 | Not reacted |
| Comp. Ex. 11 | 0.66 | 0.14 | 0.14 | 0.092 | 42.8 | 1690 | −15.9 | Not reacted |
| Comp. Ex. 12 | 0.67 | 0.10 | 0.13 | 0.067 | 43.7 | 1620 | −21.5 | Not reacted |
| Comp. Ex. 13 | 0.67 | 0.12 | 0.36 | 0.080 | 52.4 | 880 | 28.9 | Not reacted |
| Comp. Ex. 14 | 0.67 | 0.15 | 0.23 | 0.101 | 48.9 | 1520 | 20.2 | Not reacted |
| Comp. Ex. 15 | 0.69 | 0.11 | 0.37 | 0.076 | 54.1 | 740 | 38.1 | Not reacted |
| Comp. Ex. 16 | 0.72 | 0.09 | 0.35 | 0.065 | 44.8 | 980 | −1.9 | Not reacted |
| Comp. Ex. 17 | 0.72 | 0.14 | 0.31 | 0.101 | 52.6 | 1250 | 20.3 | Not reacted |
| Comp. Ex. 18 | 0.72 | 0.15 | 0.36 | 0.108 | 51.0 | 920 | 30.5 | Not reacted |
| Comp. Ex. 19 | 0.74 | 0.09 | 0.14 | 0.067 | 44.2 | 1430 | −2.4 | Not reacted |
| Comp. Ex. 20 | 0.75 | 0.08 | 0.28 | 0.060 | 42.4 | 1050 | −18.7 | Not reacted |
| Comp. Ex. 21 | 0.75 | 0.10 | 0.36 | 0.075 | 52.3 | 890 | 32.4 | Not reacted |
| Comp. Ex. 22 | 0.75 | 0.11 | 0.14 | 0.083 | 44.8 | 1380 | −17.9 | Not reacted |
| Comp. Ex. 23 | 0.75 | 0.16 | 0.34 | 0.120 | 53.7 | 1020 | 26.4 | Not reacted |
| Comp. Ex. 24 | 0.76 | 0.09 | 0.29 | 0.068 | 46.3 | 950 | −16.8 | Not reacted |
| Comp. Ex. 25 | 0.76 | 0.10 | 0.28 | 0.076 | 47.0 | 970 | −10.9 | Not reacted |
| Comp. Ex. 26 | 0.76 | 0.11 | 0.29 | 0.084 | 47.9 | 960 | −2.1 | Not reacted |
| Comp. Ex. 27 | 0.76 | 0.12 | 0.22 | 0.091 | 48.7 | 980 | 0.3 | Not reacted |
| Comp. Ex. 28 | 0.76 | 0.13 | 0.32 | 0.099 | 51.5 | 960 | 18.7 | Not reacted |
| Comp. Ex. 29 | 0.76 | 0.14 | 0.33 | 0.106 | 52.9 | 990 | 21.8 | Not reacted |
| Comp. Ex. 30 | 0.76 | 0.15 | 0.34 | 0.114 | 53.5 | 970 | 23.5 | Not reacted |

Second Group of Examples and Comparative Examples

The same raw material powders as in the first group of Examples and Comparative Examples were provided. The raw materials were weighed so that the total weight of the raw materials was 55 g and the composition was α=0.700, β=0.120 and γ=0.27. Thereafter, steps up to the step of calcination were carried out in the same manner and under the same conditions as in the first group of Examples and Comparative Examples. Sintering aids were added to the calcined powders in proportions specified in Table 2 (parts by weight based on 100 parts by weight in total of the main constituent materials; described in amounts respectively in terms of $B_2O_3$, $Li_2O$, CuO, $V_2O_5$ and $Bi_2O_3$). Subsequently, In the same manner as in the first group of Examples and Comparative Examples, pulverization, drying, granule preparation, and molding were carried out, and firing was carried out at the highest temperature shown in Table 2 for 2 hr, and the properties of the products were then measured. The results are shown in Table 2. The formulae of oxide forms and formulae of compounds actually used in the addition are shown together in Table 2.

TABLE 2

| | Oxide | | | | | | | | | | | Properties | | |
|---|---|---|---|---|---|---|---|---|---|---|---|---|---|---|
| | $B_2O_3$ | | | | $Li_2O$ | | CuO | | $V_2O_5$ | $Bi_2O_3$ | | | Relative | |
| Compound used | $B_2O_3$ | $H_3BO_3$ | BN | $B_4C$ | $Li_2CO_3$ | Li(OH) | CuO | $Cu_2O$ | $V_2O_5$ | $Bi_2O_3$ | Firing temp. | permittivity | Porosity |
| Ex. 1 | 2.0 | | | | | | | | | | 870° C. | 45.9 | 0.12 |
| Ex. 2 | | | 0.8 | | | | 1.7 | | | | 870° C. | 47.9 | 0.05 |
| Ex. 3 | | 1.5 | | | 2.0 | | | | | | 870° C. | 48.2 | 0.03 |
| Ex. 4 | | | | 2.0 | | | | | 3.0 | | 850° C. | 45.4 | 0.01 |
| Ex. 5 | | | 1.0 | | | | | 1.0 | | 2.5 | 850° C. | 47.5 | 0.01 |
| Ex. 6 | | | | 1.0 | 2.0 | | | | | | 870° C. | 47.6 | 0.04 |
| Ex. 7 | 1.1 | | | | | 1.0 | 1.9 | | | | 870° C. | 46.8 | 0.02 |
| Ex. 8 | | 0.7 | | | | | | 0.8 | | | 900° C. | 45.8 | 0.24 |
| Ex. 9 | 0.3 | | | | | | 0.7 | | | | 900° C. | 45.2 | 0.35 |
| Comp. Ex. 1 | 0.2 | | | | 0.7 | | | | | | 900° C. | 44.6 | 0.51 |
| Comp. Ex. 2 | | | | | | | | | 0.4 | 0.3 | 900° C. | 42.5 | 1.24 |
| Comp. Ex. 3 | | 1.5 | | | 3.2 | | | | 0.4 | | 850° C. | 44.8 | 0.01 |
| Comp. Ex. 4 | | | | | | 2.8 | | | 2.8 | | 850° C. | 43.7 | 0.02 |

The invention claimed is:

1. A high-frequency dielectric material, comprising:
   a composition of main constituent materials having a formulation of CaO: 1 mole, $Nb_2O_5$: $(1-\alpha\times\beta)/3$ mole, ZnO: $(1-\alpha)/3$ mole, $TiO_2$: $\gamma$ mole, and $Li_2O$: $\alpha\times(1-\beta)/6$ mole, wherein $0.65 \leqq \alpha \leqq 0.75$, $0.09 \leqq \beta \leqq 0.15$, $0.066 \leqq \alpha\times\beta \leqq 0.100$, and $0.15 \leqq \gamma \leqq 0.35$; and
   1 to 5 parts by weight, based on 100 parts by weight of the composition of main constituent materials, of a sintering aid selected from the group consisting of oxides of copper (Cu), boron (B), lithium (Li), bismuth (Bi), and vanadium (V) and a mixture of two or more of said oxides.

2. The high-frequency dielectric material according to claim 1, wherein at least boron oxide and lithium oxide are contained as the sintering aid.

3. A process for producing a high-frequency dielectric material, comprising the steps of:
   mixing main constituent materials according to a formulation of CaO: 1 mole, $Nb_2O_5$: $(1-\alpha\times\beta)/3$ mole, ZnO: $(1-\alpha)/3$ mole, $TiO_2$: $\gamma$ mole, and $Li_2O$: $\alpha\times(1-\beta)/6$ mole, wherein $0.65 \leqq \alpha \leqq 0.75$, $0.09 \leqq \beta \leqq 0.15$, $0.066 \leqq \alpha\times\beta \leqq 0.100$, and $0.15 \leqq \gamma \leqq 0.35$;
   calcining the resultant main constituent material mixture at a temperature of 800 to 1100° C.;
   while pulverizing the main constituent material mixture, mixing 1 to 5 parts by weight, based on 100 parts by weight of the main constituent material mixture, of a sintering aid selected from the group consisting of simple substances or compounds of copper, boron, lithium, bismuth and vanadium and their mixtures, into the main constituent material mixture;
   molding the resultant mixture of the main constituent material mixture with the sintering aid; and
   firing the molded product of the mixture of the main constituent material mixture with the sintering aid at a temperature of 850 to 900° C.

4. A process for producing a high-frequency dielectric material, comprising the steps of:
   mixing main constituent materials according to a formulation of CaO: 1 mole, $Nb_2O_5$: $(1-\alpha\times\beta)/3$ mole, ZnO: $(1-\alpha)/3$ mole, $TiO_2$: $\gamma$ mole, and $Li_2O$: $\alpha\times(1-\beta)/6$ mole, wherein $0.65 \leqq \alpha \leqq 0.75$, $0.09 \leqq \beta \leqq 0.15$, $0.066 \leqq \alpha\times\beta \leqq 0.100$, and $0.15 \leqq \gamma \leqq 0.35$;
   subjecting the resultant main constituent material mixture to primary calcination at a temperature of 800 to 1100° C.;
   mixing 1 to 5 parts by weight, based on 100 parts by weight of the main constituent material mixture, of a sintering aid selected from the group consisting of simple substances or compounds of copper, boron, lithium, bismuth and vanadium and their mixtures, into the main constituent material mixture;
   subjecting the resultant mixture of the main constituent material mixture with the sintering aid to secondary calcination at a temperature of 800 to 1100° C.;
   pulverizing the mixture of the main constituent material mixture with the sintering aid subjected to the secondary calcination;
   molding the pulverized product of the mixture of the main constituent material mixture with the sintering aid; and
   firing the molded product of the mixture of the main constituent material mixture with the sintering aid at a temperature of 850 to 900° C.

5. The process according to claim 4, wherein at least a simple substance or compound of boron and a simple substance or compound of lithium are contained as the sintering aid.

6. The process according to claim 4, wherein, after the molding of the mixture of the main constituent material mixture with the sintering aid, a silver (Ag) or copper (Cu) conductor is formed on the molded product and the assembly is then fired.

7. The process according to claim 3, wherein at least a simple substance or compound of boron and a simple substance or compound of lithium are contained as the sintering aid.

8. The process according to claim 3, wherein, after the molding of the mixture of the main constituent material mixture with the sintering aid, a silver (Ag) or copper (Cu) conductor is formed on the molded product and the assembly is then fired.

* * * * *